United States Patent
Dyba et al.

(10) Patent No.: US 8,295,474 B2
(45) Date of Patent: Oct. 23, 2012

(54) ECHO CANCELLER WITH HEAVY DOUBLE-TALK ESTIMATION

(75) Inventors: Roman A. Dyba, Cedar Park, TX (US);
Hongyang Deng, Austin, TX (US);
Brad L. Zwernemann, Campbell, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 916 days.

(21) Appl. No.: 12/188,819

(22) Filed: Aug. 8, 2008

(65) Prior Publication Data

US 2010/0034373 A1 Feb. 11, 2010

(51) Int. Cl.
*H04M 9/08* (2006.01)
*H04M 1/00* (2006.01)
*H04B 3/20* (2006.01)
*H04B 1/38* (2006.01)

(52) U.S. Cl. .............. 379/406.05; 379/406.04; 370/287; 370/289; 455/570

(58) Field of Classification Search ........................ None
See application file for complete search history.

(56) References Cited

U.S. PATENT DOCUMENTS

| | | | |
|---|---|---|---|
| 5,263,019 A | 11/1993 | Chu | |
| 6,035,034 A * | 3/2000 | Trump | 379/406.06 |
| 6,192,126 B1 * | 2/2001 | Koski | 379/406.14 |
| 6,765,931 B1 | 7/2004 | Rabenko et al. | |
| 6,904,146 B2 | 6/2005 | Domer et al. | |
| 6,968,064 B1 * | 11/2005 | Ning | 381/66 |
| 7,016,488 B2 | 3/2006 | He et al. | |
| 7,031,269 B2 | 4/2006 | Lee | |
| 7,099,458 B2 | 8/2006 | Piket et al. | |
| 2004/0037417 A1 * | 2/2004 | Seibert | 379/406.01 |
| 2005/0286714 A1 | 12/2005 | Tokuda | |
| 2007/0041575 A1 * | 2/2007 | Alves et al. | 379/406.08 |

* cited by examiner

*Primary Examiner* — Fan Tsang
*Assistant Examiner* — Jeffrey Lytle
(74) *Attorney, Agent, or Firm* — Joanna G. Chiu

(57) ABSTRACT

In a data processing system, a method includes receiving samples of a send path input signal (Sin) and samples of a receive path input signal (Rin); in response to receiving each sample of the send path input signal, providing a double-talk indicator to indicate whether or not double-talk has been detected; using the double-talk indicator to determine a double-talk density within a predetermined number of samples of the send path input signal or the receive path input signal; and using the double-talk density to provide a heavy double-talk indicator which indicates whether or not heavy double-talk has been detected. In response to the heavy double-talk indicator indicating that heavy double-talk has been detected, a heavy double-talk mode may be entered.

17 Claims, 5 Drawing Sheets

ECHO CANCELLER WITH HEAVY DOUBLE-TALK ESTIMATION

BACKGROUND

1. Field

This disclosure relates generally to echo cancellation, and more specifically, to an echo canceller with heavy double-talk estimation.

2. Related Art

Traditional echo cancellers have double-talk detectors to detect double-talk. Once such double-talk is detected, the echo cancellers typically disable non-linear processing. While this simple approach helps in some circumstances, in other circumstances it is not so effective. For example, during certain conversation patterns, despite having this feature, transmitted speech can become temporarily clipped possibly resulting in unintelligible speech. This is particularly true when there is "heavy" double talk.

Accordingly, there is a need for an echo-canceller with heavy double-talk estimation.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, in a data processing system, a method including receiving samples of a send path input signal (Sin) and samples of a receive path input signal (Rin) is provided. The method further includes in response to receiving each sample of the send path input signal, providing a double-talk indicator to indicate whether or not double-talk has been detected. The method further includes using the double-talk indicator to determine a double-talk density within a predetermined number of samples of the send path input signal or the receive path input signal. The method further includes using the double-talk density to provide a heavy double-talk indicator which indicates whether or not heavy double-talk has been detected.

In another aspect, in a data processing system, a method including receiving a send path input signal (Sin) and a receive path input signal (Rin) is provided. The method further includes using the send path input signal and the receive path input signal to generate an error signal. The method further includes using a double-talk density to selectively enter a heavy double-talk mode. The method further includes when not in heavy double-talk mode and when no double talk is present, performing non-linear processing of the error signal, wherein non-linear processing comprises a plurality of processing functions. The method further includes when in heavy double-talk mode, disabling at least one of the plurality of processing functions regardless of whether double-talk is present or not.

In yet another aspect, a data processing system including a first input which receives samples of a send path input signal is provided. The data processing system further includes a second input which receives samples of a receive path input signal. The data processing system further includes a double-talk detector which receives the send path input signal and the receive path input signal, and, in response to each sample of the send path input signal, provides a double-talk indicator to indicate whether or not double-talk has been detected. The data processing system further includes a heavy double-talk estimator which uses the double-talk indicator to determine a double-talk density and uses the double-talk density to provide a heavy double-talk indicator which indicates whether or not heavy double-talk mode has been entered.

Figure 1:
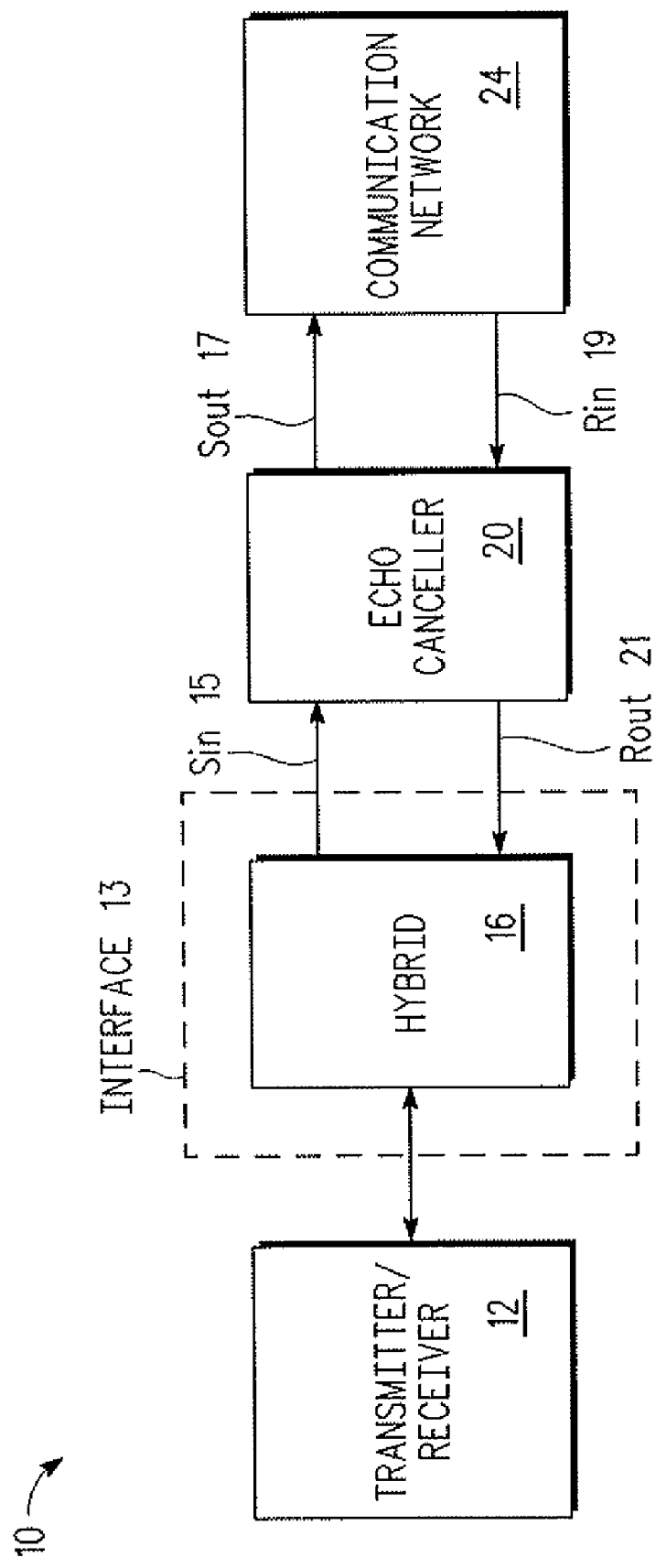
FIG. 1 shows a communication system illustrating the use of an echo canceller.

FIG. 1 shows a communication system 10 illustrating the use of an echo canceller 20. Communication system 10 may include a transmitter/receiver 12 coupled to an interface 13, which may further include a hybrid circuit 16. Communication system 10 may further include an echo canceller 20 coupled to interface 13 and a communication network 24. Transmitter/receiver 12 may be a voice terminal that is used for a voice call between at least two parties. In one embodiment, transmitter/receiver 12 may be coupled to interface 13 using a two-wire connection, such as a twisted pair connection. Hybrid circuit 16 may be coupled to echo canceller 20 using a four-wire connection. Echo canceller 20 may receive send path input signal (Sin) 15 from interface 13 and provide send path output signal (Sout) 17 to communication network 24. Echo canceller 20 may also receive path input signal (Rin) 19 and provide receive path output signal (Rout) 21 to interface 13. Although FIG. 1 shows a specific communication system 10, echo canceller 20 may be included in other types of communication systems and applications.

Figure 2:
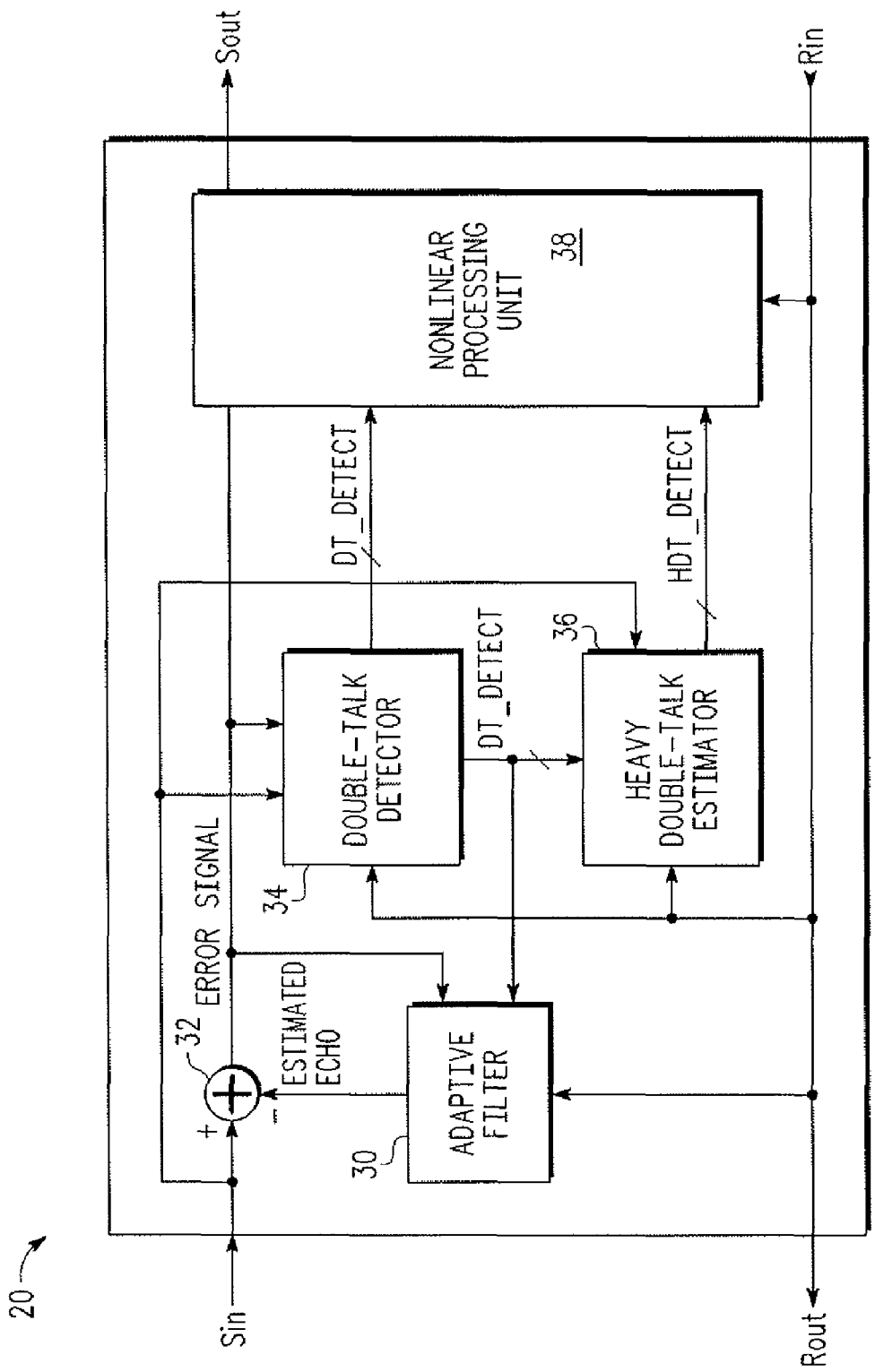
FIG. 2 shows a block diagram of an exemplary echo canceller with heavy double-talk estimation.

FIG. 2 shows a block diagram of echo canceller 20 with heavy double-talk estimation. Echo canceller 20 may include an adaptive filter 30, a summer 32, a double-talk detector 34, a heavy double-talk estimator 36, and a nonlinear processing unit 38. Adaptive filter 30 may estimate an echo present in the send input path signal (Sin). Summer 32 may subtract the estimated echo (shown as ESTIMATED ECHO in FIG. 2) from an actual echo present in the send path input signal (Sin) to generate an error signal (shown as ERROR SIGNAL in FIG. 2). Double-talk detector 34 may detect double talk, i.e., detect a circumstance when both parties are talking at the same time or if only the near end party talks and the far end party listens. Upon the detection of double-talk, a DT_DETECT indicator may be set to a value 1, indicating that double-talk is present. Heavy double-talk estimator 36 may determine whether double-talk is present by polling double-talk detector 34. In addition, heavy double-talk estimator 36 may determine whether heavy double-talk is present and if so, a HDT_DETECT indicator may be set. Nonlinear processing unit 38 may perform nonlinear processing on the output of summer 32 and generate send path output signal (Sout). Nonlinear processing unit 38 may include various nonlinear processing functions, such as a nonlinear processor, a nonlinear suppressor, an additional nonlinear processor, and a dynamic gain insertion (DGI) module. Echo canceller 20 may be implemented using software, hardware, and/or combination of software/hardware. Software code corresponding to the various components of echo canceller 20 may be executed by a processor, such as a digital signal processor. Although FIG. 2 shows a specific number of components that are interconnected in a specific manner, echo canceller 20 may include additional components and the shown components may be arranged differently. For example, although not shown, echo canceller 20 may include a DC notch filter, a non-adaptive filter, a gain control unit, and/or other components.

Figure 3:
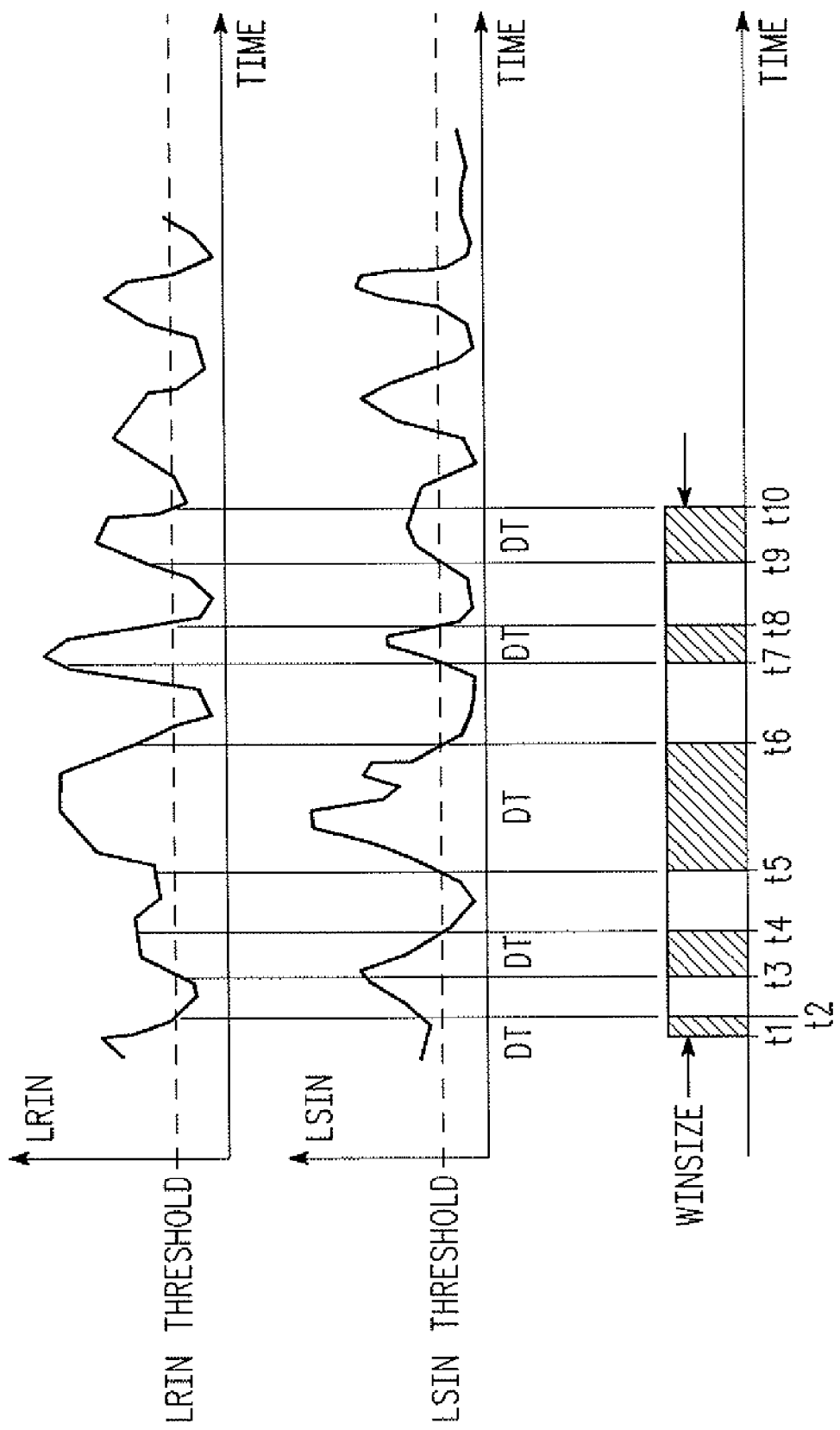
FIG. 3 illustrates heavy double talk estimation using a sliding window method.

FIG. 3 illustrates heavy double talk estimation using a sliding window method. LRIN represents a short term energy signal level corresponding to the receive path input signal (Rin). The LRIN threshold represents a predetermined threshold for the short term energy signal level corresponding to the receive path input signal (Rin). The LRIN signal level and the LRIN threshold may be represented using linear energy units or logarithmic quantity. By way of example, the LRIN threshold may be in a range between approximately −30 dBm0 to −40 dBm0. The LSIN signal level represents a short term energy signal level corresponding to send path input signal (Sin). The LSIN threshold represents a predetermined threshold for the short term energy signal level corresponding to the send path input signal (Sin). The LSIN signal level and the LSIN threshold may be represented using linear energy units or logarithmic quantity. By way of example, the LSIN threshold may be in a range between approximately −36 dBm0 to −46 dBm0. These short term energy signal levels may be estimated by echo canceller 20 using a short term level estimator. For a predetermined window size (WINSIZE), time periods may be identified where, in one example, both the LRIN signal level and the LSIN signal level exceed their respective thresholds. For example, in FIG. 3, those time periods are t1 to t2, t3 to t4, t5 to t6, t7 to t8, and t9 to t10. Each of these time periods is indicated as time periods, during which double talks is occurring by letters DT. Although FIG. 3 illustrates double talk occurring when both the LRIN signal level and the LSIN signal level exceed their respective thresholds, double talk may be detected when only the LSIN signal level exceeds its respective threshold regardless of the LRIN signal level. In one embodiment, heavy double-talk estimator 36 may generate double-talk density (WINDT), which may be a ratio of the total length of the time corresponding to time periods t1 to t2, t3 to t4, t5 to t6, t7 to t8, and t9 to t10 to the predetermined window size (WINSIZE).

Figure 4:
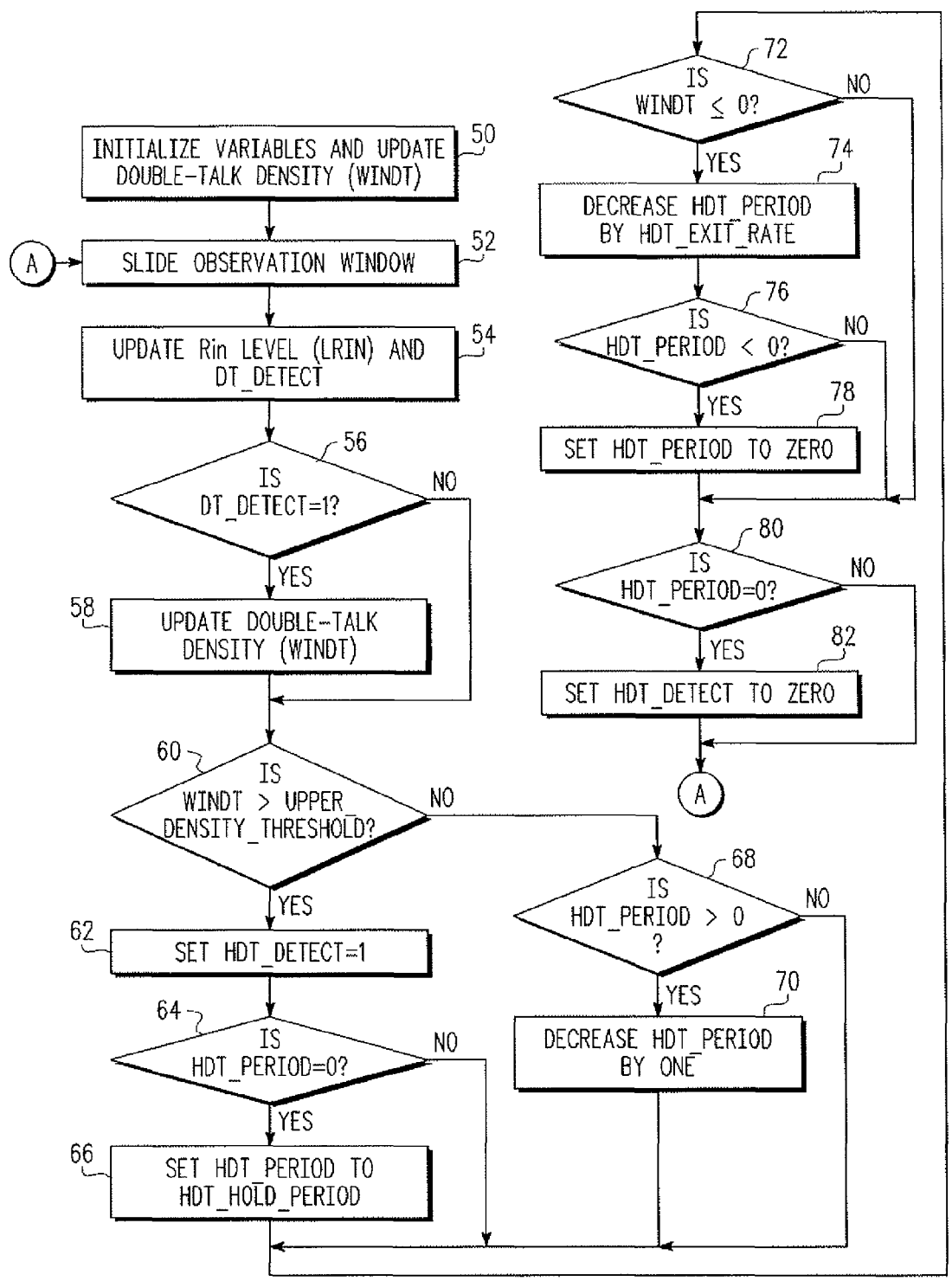
FIG. 4 shows a flowchart of an exemplary method for heavy double-talk estimation.

FIG. 4 shows a flowchart of an exemplary method for heavy double-talk estimation. In one embodiment, heavy double-talk estimator 36 may first initialize variables and update double-talk density (WINDT) (step 50). By way of example, as part of this step, DT_DETECT, HDT_DETECT, HDT_PERIOD, and HDT_HOLD_PERIOD may be set to zero. Next, heavy double-talk estimator 36 may slide observation window, such as the observation window shown in FIG. 3 (step 52). By way of example, the observation window may be slid a predetermined number of samples or by a predetermined number of blocks of samples. Next, in step 54, the values corresponding to LRIN and DT_DETECT may be updated. In one embodiment, DT DETECT may be set to 1 for those time periods where both the LRIN signal level and the LSIN signal level exceed their respective thresholds. Alternatively, DT_DETECT may be set to one if only the LSIN signal level exceeds its respective threshold. Next, in step 56 if DT_DETECT is set to 1, then in step 58, double-talk density (WINDT) is updated. As part of this step, WINDT may be recalculated and a new value of the ratio of the total length of the time corresponding to time periods t1 to t2, t3 to t4, t5 to t6, t7 to t8, and t9 to t10 to the predetermined window size (WINSIZE) be determined. Alternatively, this value may be calculated by using time periods in which only the LSIN signal level exceeds its respective threshold. Next, in step 60, heavy double-talk estimator 36 may determine whether double-talk density (WINDT) exceeds a threshold (UPPER_DENSITY_THRESHOLD). If that is the case, then in step 62, HDT_DETECT variable may be set to 1 indicating that heavy double-talk has been detected. Next, in step 64, heavy double-talk estimator 36 may determine whether heavy double-talk period (HDT_PERIOD) is zero. If so, then heavy double-talk estimator may set the heavy double-talk period (HDT_PERIOD) to heavy double-talk hold period value (HDT_HOLD_PERIOD). Heavy double-talk period corresponds to a predetermined time period starting from when HDT-DETECT is set to 0 (and stays 0) during which an exit from the heavy double-talk mode cannot be made.

Referring still to FIG. 4, in step 72, heavy-double talk estimator 36 determines whether double-talk density (WINDT) is less than or equal to zero. If WINDT is less than or equal to zero, then the heavy double-talk period (HDT_PERIOD) is decreased by a predetermined amount (HDT_EXIT_RATE). This is done to ensure that the exit from the heavy double-talk mode is graceful. Next, in step 76, heavy double-talk estimator 36 may determine whether the heavy double-talk period (HDT_PERIOD) is less than zero. If so, then the HDT_PERIOD is set to zero. Next, in step 80, heavy double-talk estimator 36 determines whether HDT_PERIOD equals zero. If it does, then in step 82, HDT_DETECT is set to zero. Next, the process repeats starting with step 52, sliding the observation window by a predetermined number of samples. Thus, steps 52 to 82 are performed repeatedly as part of a loop.

Figure 5:
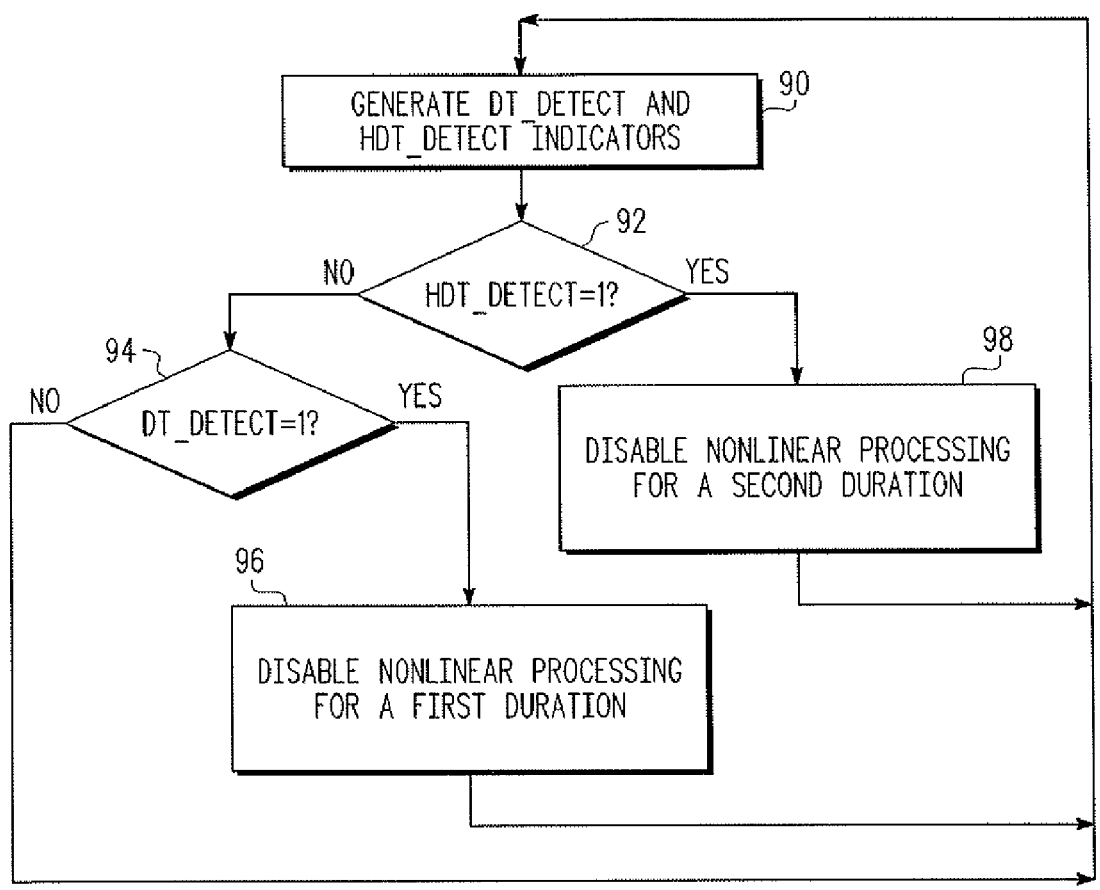
FIG. 5 shows a flowchart of an exemplary method for controlling non-linear processing based on heavy double-talk estimation.

FIG. 5 shows a flowchart of an exemplary method for controlling non-linear processing based on heavy double-talk estimation. In step 90, double-talk and heavy double-talk indicators, such as DT_DETECT and HDT_DETECT may be generated using the method shown in FIG. 4, for example. In step 92, when heavy double-talk detector 36 determines whether heavy double-talk has been detected (HDT_DETECT=1). If not, heavy double-talk detector 36 determines whether double-talk has been detected (DT_DETECT=1). If so, then in step 96, nonlinear processing is disabled for a first duration. If in step 92, heavy double-talk is detected, then in step 98 nonlinear processing is disabled for a second duration. In one embodiment, second duration is longer than the first duration. As discussed earlier, nonlinear processing unit 38 may include various nonlinear processing functions, such as a nonlinear processor, a nonlinear suppressor, an additional nonlinear processor, and a dynamic gain insertion (DGI) module. In one embodiment, at least one of the non linear processing functions may be disabled when heavy double-talk is detected. If no heavy-double talk is detected, then non linear processing functions may be used to process the error signal generated by the echo canceller.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary echo canceller architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system, a method comprising:
   receiving samples of a send path input signal (Sin) and samples of a receive path input signal (Rin);
   in response to receiving each sample of the send path input signal, providing a double-talk indicator to indicate whether or not double-talk has been detected;
   using the double-talk indicator to determine a double-talk density within a predetermined number of samples of the send path input signal or the receive path input signal; and
   using the double-talk density to set a heavy double-talk indicator to indicate whether or not heavy double-talk has been detected and to determine a mode of the data processing system, wherein:
   in response to determining that the double-talk density is between a first density threshold and a second density threshold, wherein the first density threshold is greater than the second density threshold, setting the heavy double-talk indicator to indicate that heavy double-talk has not been detected and entering the data processing system into a double-talk mode, and
      in response to entering the double-talk mode, disabling non-linear processing for a first duration; and
   in response to determining that the double-talk density exceeds the first density threshold, setting the heavy double-talk indicator to indicate that heavy double-talk has been detected and entering the data processing system into a heavy double-talk mode, and
      in response to entering the heavy double-talk mode, disabling nonlinear processing for a second duration, wherein the first duration is different than the second duration.

2. The method of claim 1, wherein the double-talk density indicates a number of samples within the predetermined number of samples for which double-talk was detected relative to the predetermined number of samples.

3. The method of claim 2, wherein the predetermined number of samples is defined by a window, the method further comprising:
   sliding the window to indicate a next predetermined number of samples.

4. The method of claim 3, wherein the sliding the window comprises sliding the window by one sample of the send path input signal or the input path input signal to indicate the next predetermined number of samples.

5. The method of claim 1, further comprising:
   exiting heavy double-talk mode only after at least the second duration has expired.

6. The method of claim 5, wherein the exiting the heavy double-talk mode comprises exiting the heavy double-talk mode when the double-talk density is below the second threshold and the second duration has expired.

7. The method of claim 1, further comprising:
   using the send path input signal and the receive path output signal to generate an error signal; and
   when in the heavy double-talk mode, disabling nonlinear processing of the error signal.

8. The method of claim 7, further comprising:
   when not in the heavy double-talk mode and when the double-talk indicator indicates that no double-talk has been detected, performing nonlinear processing of the error signal; and
   when in the heavy double-talk mode, continuing to disable nonlinear processing of the error signal even when the double-talk indicator indicates that no double-talk has been detected.

9. In a data processing system, a method comprising:
   receiving a send path input signal (Sin) and a receive path input signal (Rin);
   using the send path input signal and the receive path input signal to generate an error signal;
   using a double-talk density to indicate the presence of heavy double-talk and to determine a mode of the data processing system;
   entering the data processing system into a double-talk mode when determining that the double-talk density is between a first density threshold and a second density threshold;
   entering the data processing system into a heavy double-talk mode when determining that the double-talk density exceeds the first density threshold, the first density threshold being greater than the second density threshold;

when not in heavy double-talk mode and when no double talk is present, performing non-linear processing of the error signal, wherein non-linear processing comprises a plurality of processing functions;

when in double-talk mode, disabling at least one of the processing functions for a first duration; and when in heavy double-talk mode, disabling the at least one of the plurality of processing functions for a second duration regardless of whether double-talk is present or not, the first duration is different than the second duration.

10. The method of claim 9, wherein the using the double-talk density to selectively enter heavy double-talk mode comprises:

determining the double-talk density over a predetermined number of samples of the send path input signal or the receive path input signal.

11. The method of claim 10, wherein the double-talk density indicates a number of samples within the predetermined number of samples for which double-talk was present relative to the predetermined number of samples.

12. The method of claim 9, further comprising:

exiting heavy double-talk mode when the double-talk density falls below the second density threshold.

13. The method of claim 9, further comprising, when not in heavy double-talk mode:

performing nonlinear processing of the error signal when double-talk is not present.

14. A data processing system, comprising:

a first input which receives samples of a send path input signal;

a second input which receives samples of a receive path input signal;

a double-talk detector which receives the send path input signal and the receive path input signal, and, in response to each sample of the send path input signal, provides a double-talk indicator to indicate whether or not double-talk has been detected; and a heavy double-talk estimator which uses the double-talk indicator to determine a double-talk density and uses the double-talk density to provide a heavy double-talk indicator which indicates whether or not heavy double-talk has been detected and to determine a mode of the data processing system, wherein:

the data processing system enters into a double-talk mode when determining that the double-talk density is between a first density threshold and a second density threshold and nonlinear processing is disabled for a first duration when double-talk has been detected; and the data processing system enters into a heavy double-talk mode when determining that the double-talk density exceeds the first density threshold and nonlinear processing is disabled for a second duration when the heavy double-talk mode has been entered, further wherein the first duration is greater than the second duration.

15. The data processing system of claim 14, further comprising:

an adaptive filter which receives the receive path input signal and provides a filtered output;

a nonlinear processing unit which receives an error signal generated using the send path input signal and the filtered output, the nonlinear processing unit, when not in heavy double-talk mode and when the double-talk indicator indicates that double talk is not present, performing nonlinear processing of the error signal, and, when in heavy double-talk mode, the nonlinear processing unit disabled from performing nonlinear processing of the error signal, regardless of whether double-talk is present or not.

16. The data processing system of claim 14, wherein the heavy double-talk estimator provides the heavy double-talk indicator to indicate exit from heavy double-talk mode when the double-talk density falls below the second density threshold and at least a predetermined heavy double-talk mode duration has expired.

17. The data processing system of claim 14, wherein the double-talk density is determined over a predetermined number of samples of the send path input signal or the receive path input signal, and wherein the double-talk density indicates a number of samples within the predetermined number of samples for which double-talk was present relative to the predetermined number of samples.

* * * * *